(No Model.)  2 Sheets—Sheet 1.
J. D. TINNING.
PLANTER.

No. 591,613. Patented Oct. 12, 1897.

Witnesses  Inventor
  By his Attorneys, James D. Tinning
  C. A. Snow & Co.

(No Model.)
2 Sheets—Sheet 2.

J. D. TINNING.
PLANTER.

No. 591,613. Patented Oct. 12, 1897.

Witnesses
Jas. H. McCathran
V. B. Hillyard.

Inventor
James D. Tinning
By his Attorneys
C. A. Snow & Co.

UNITED STATES PATENT OFFICE.

JAMES D. TINNING, OF HUTTO, TEXAS.

PLANTER.

SPECIFICATION forming part of Letters Patent No. 591,613, dated October 12, 1897.

Application filed May 8, 1897. Serial No. 635,725. (No model.)

*To all whom it may concern:*

Be it known that I, JAMES D. TINNING, a citizen of the United States, residing at Hutto, in the county of Williamson and State of Texas, have invented a new and useful Planter, of which the following is a specification.

This invention relates to that class of agricultural implements which are especially designed for planting seed and preparing the ground in advance of the opener, so as to remove weeds, trash, and other foreign matter from the path of the shovel preparing the furrow to receive the seed.
One of the principal features of the improvement is to combine with an implement of the character aforesaid means under the control of the driver for simultaneously raising and lowering the sweep and the planting mechanism, said means being easy of operation and effective for the purpose designed and enabling the driver to control the elevation of the earth-treating devices at all times.

For a full understanding of the merits and advantages of the invention reference is to be had to the accompanying drawings and the following description.

Figure 1:
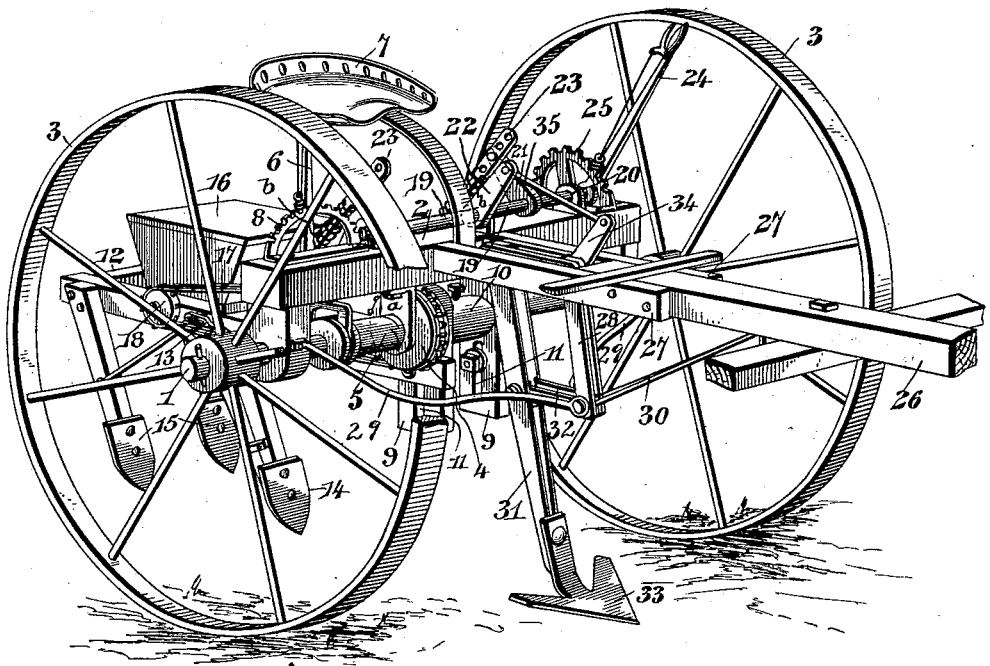
Figure 4:
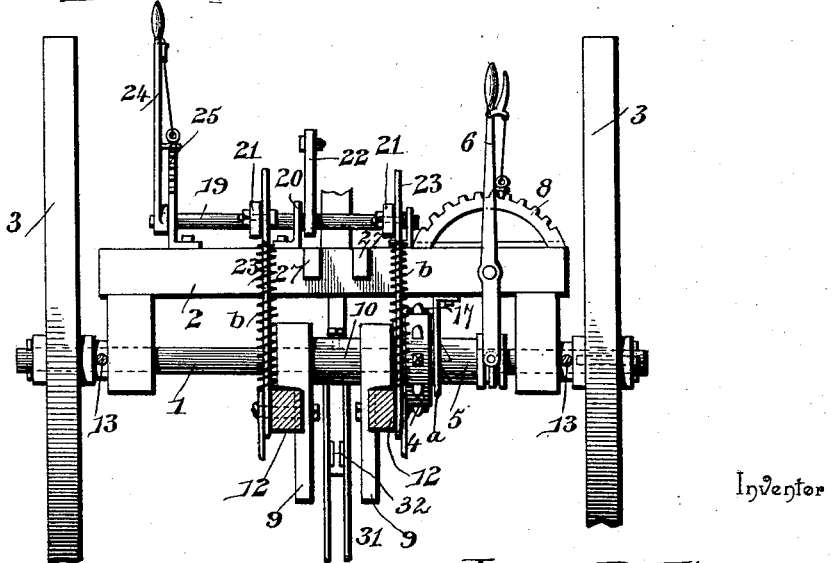
Figure 2:
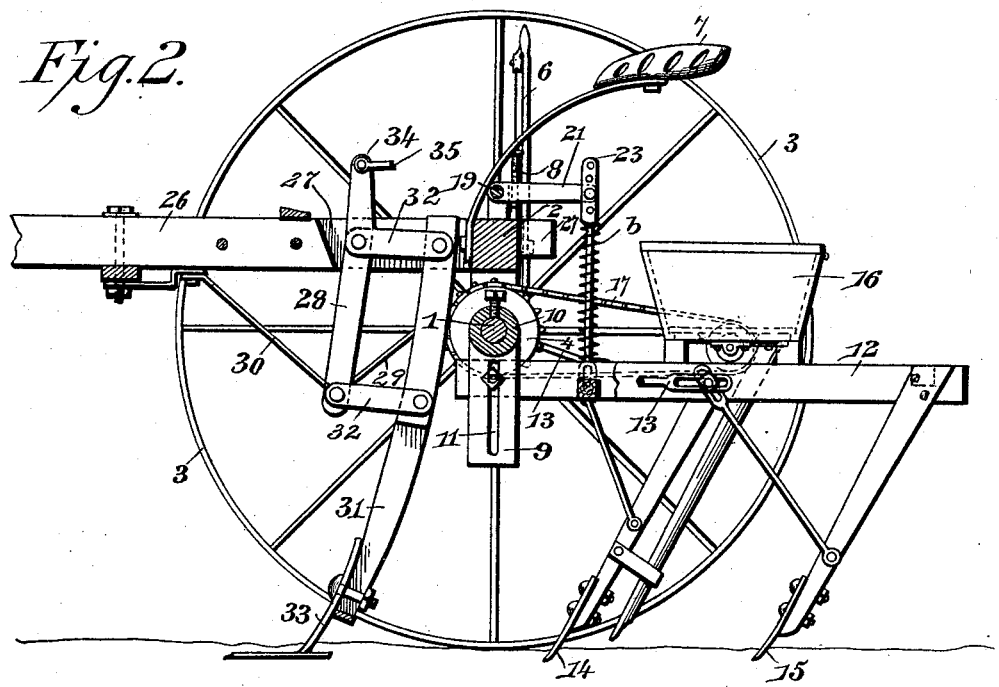
Figure 3:
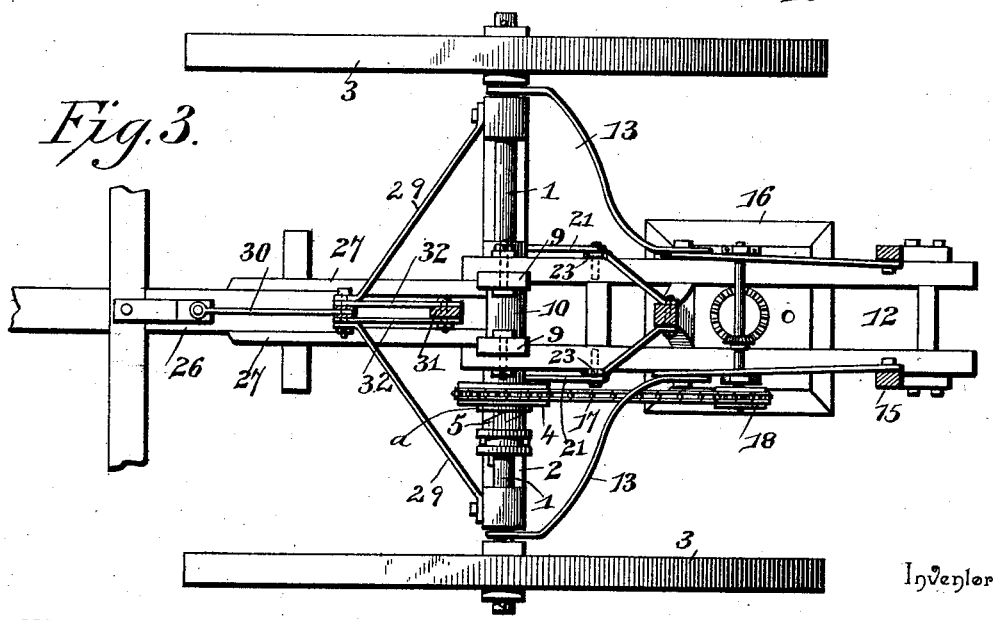

The improvement is susceptible of various changes in the form, proportion, and the minor details of construction without departing from the principle or sacrificing any of the advantages thereof, and to a full disclosure of the invention an adaptation thereof is shown in the accompanying drawings, in which—
Figure 1 is a perspective view of a planter embodying the improvements. Fig. 2 is a longitudinal section thereof. Fig. 3 is a view of the machine inverted. Fig. 4 is a rear view, parts being broken away.
Corresponding and like parts are referred to in the following description and indicated in the several views of the accompanying drawings by the same reference-characters.

The axle 1 is journaled in the pendent portions of an arched frame 2 and receives ground-wheels 3 upon its ends, one of the ground-wheels being secured to the axle and serving as a driver to rotate it for operating the seeding mechanism. A sprocket-wheel 4 is loosely mounted upon the axle and is thrown into and out of gear by means of a clutch-sleeve 5, slidingly mounted upon the axle and operated by means of a lever 6, fulcrumed to the frame 2 and within easy reach of the driver's seat 7, said lever being held in an adjusted position by the usual hand-latch engaging a notched segment 8, secured to the frame 2. Hangers 9 are mounted upon the axle and are spaced apart by a sleeve 10, slipped upon the axle and held thereto by a binding-screw, and these hangers have slots 11 to admit of the planter-frame 12 making adjustable and loose connection therewith. The planter-frame consists of longitudinal bars and transverse blocks and is connected at its front end with the hangers 9 in such a manner as to be capable of vertical movement to admit of the planting mechanism being raised and lowered. Braces 13 are connected at their front ends with the end portions of the axle and have their rear ends adjustably connected with the planter-frame and serve to hold the latter against lateral movement when the parts have been moved to the required position. The opener 14, coverers 15, and hopper 16, the latter inclosing the seed-dropping mechanism, are of ordinary construction and operate in the usual way.

The seed-dropping mechanism is actuated from the sprocket-wheel 4 by means of a sprocket-chain 17, passing around a sprocket-wheel 18 on the shaft of the seeding mechanism.

A shaft 19 is journaled in brackets or suitable bearings 20, provided on the frame 2, and has rearwardly-extending arms 21 and a vertical arm 22, the rear arms being connected with the planter-frame by means of rods 23, so that upon turning the shaft 19 in its bearings the planter-frame will be raised or lowered, as desired. The rods 23 have adjustable connection with the arms 21, whereby the elevation of the planting mechanism can be regulated. A lever 24 is secured to the shaft 19 and is supplied with a hand-latch of usual construction to engage with a notched segment 25 for holding the lever in an adjusted position, and this lever extends within convenient reach of the seat 7.

The tongue 26 is secured at its inner end between plates 27, which are spaced apart and fastened at their rear ends to the arched frame 2. A standard 28 is secured at its upper end between the plates 27, and its lower end is braced by lateral stays 29 and a front stay 30. A plow-stock 31 is connected by means of links 32 with the lower end of the standard 28 and is capable of a vertical adjustment by a swinging movement of the links, as will be readily comprehended. The plow-stock is provided at its lower end with a sweep 33 or shovel of desired form according to the nature of the work, and its upper end is pivotally connected with the horizontal arm of a bell-crank lever 34, which has its vertical arm connected by means of a link 35 with the vertical arm 22, whereby upon turning the shaft 19 the plow-stock will be raised or lowered. The shaft 19 is turned by means of the lever 24, and the arm 22, connected therewith, moving turns the bell-crank lever 34 upon its fulcrum with the plates 27, and the free end of the horizontal arm of the bell-crank lever, swinging vertically and having pivotal connection with the plow-stock 31, causes a vertical movement of the said plow-stock, the movement being up or down, according to the direction of operating the lever 24. When the plow-stock is properly adjusted, it is held fast by the hand-latch of the lever 24 engaging with the notched segment 25. The links 32 coöperate with the horizontal arm of the bell-crank lever to retain the plow-stock in proper position at all stages of its adjustment. By having the plow-stock and the planter-frame connected with the shaft 19 in the manner set forth both are simultaneously raised and lowered, as desired, according to the direction of movement of the lever 24, thereby enabling the driver to throw the earth-treating devices out of action when reaching the end of the field, so as not to interfere with the turning of the machine prior to recrossing the field.

The planter-frame has a limited vertical movement to admit of the shovels or earth-working devices riding over stones, roots, or other unyielding obstructions, whereby injury thereto is obviated. The planter-frame is held down by springs $b$, mounted upon the rods and confined between shoulders near the upper ends thereof and the bars of the said frame. The lower ends of the rods 23 are slotted to receive the pins or fastenings connecting them with the planter-frame. The sprocket-wheel 4 is held in place by a bracket $a$, secured to the frame 2, thereby enabling the clutch-sleeve 5 to be moved on the axle 1.

Having thus described the invention, what is claimed as new is—

1. In an agricultural implement, the combination of a standard, a plow-stock, links connecting the plow-stock with the standard, and means applied to the plow-stock for adjusting it vertically, substantially as set forth.

2. In an agricultural implement, the combination of a standard, a plow-stock, links connecting the plow-stock with the standard, a bell-crank lever having one arm in engagement with the plow-stock, and means applied to the opposite end of the bell-crank lever for turning it to adjust the plow-stock vertically and holding it in an adjusted position, substantially as set forth.

3. In an agricultural implement, the combination of the vertically-adjustable plow-stock, a frame mounted independently of the plow-stock and capable of vertical movement and provided with planting mechanism, a shaft mounted independently of the plow-stock and frame bearing the planting mechanism and having oppositely-extending arms, independent connections between the said arms and the plow-stock and planter-frame, and a lever applied to the shaft for turning it to effect a simultaneous vertical movement of the plow-stock and planter-frame, substantially as and for the purpose specified.

4. In an agricultural implement, the combination of an axle, hangers mounted upon the axle, a planter-frame capable of vertical adjustment having sliding connection with the said hangers, laterally-extending braces having connection at one end with the axle to turn thereon and having their opposite end slidingly connected with the planter-frame, and means for raising and lowering the planter-frame, and admitting of the latter moving to adapt itself to the rolling surface of the ground, substantially as set forth.

5. In an agricultural implement, the combination of an axle, slotted hangers pendent from the axle, a vertically-adjustable planter-frame having sliding connection with the slotted portion of the hangers, braces mounted upon the axle and having their rear ends curving inwardly toward each other and slotted, and having adjustable connection with the planter-frame, and means for raising and lowering the planter-frame and admitting of it turning to adapt itself to the nature of the ground over which the implement is drawn, substantially as set forth.

6. In combination, a vertically-adjustable frame bearing a planting mechanism, a transverse shaft having horizontally-extending arms and provided with means for turning it in its bearings and holding it in an adjusted position, rods having adjustable connection with the outer ends of the horizontal arms and having their lower ends slotted and receiving fastenings by means of which they are connected to the planter-frame, and springs mounted upon the rods and interposed between the planter-frame and projecting parts or stops of the said rods, substantially as and for the purpose set forth.

In testimony that I claim the foregoing as my own I have hereto affixed my signature in the presence of two witnesses.

JAMES D. TINNING.

Witnesses:
A. W. HAYSLIP,
WILLIAM H. HYSLOP.